US012260825B1

(12) United States Patent
Cheng et al.

(10) Patent No.: US 12,260,825 B1
(45) Date of Patent: Mar. 25, 2025

(54) DRIVING DEVICE FOR SELF-LUMINOUS DISPLAY PANEL AND OPERATION METHOD THEREOF

(71) Applicant: Novatek Microelectronics Corp., Hsinchu (TW)

(72) Inventors: Yi-Shen Cheng, Tainan (TW); Che Wei Hsu, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/473,265

(22) Filed: Sep. 24, 2023

(51) Int. Cl.
*G09G 3/3258* (2016.01)

(52) U.S. Cl.
CPC ... *G09G 3/3258* (2013.01); *G09G 2320/0673* (2013.01)

(58) Field of Classification Search
CPC ..................... G09G 3/3258; G09G 2320/0673
See application file for complete search history.

(56) References Cited

U.S. PATENT DOCUMENTS 10,403,223 B2 9/2019 Wen et al.
2008/0150865 A1* 6/2008 Choi .................... G09G 3/3688 345/88
2011/0032240 A1* 2/2011 Wang .................... H03F 3/3022 345/212
2013/0135362 A1* 5/2013 Kim ..................... G09G 3/3696 345/690
2017/0243559 A1 8/2017 Xi et al.
2018/0075817 A1 3/2018 Kim et al.
2018/0268780 A1* 9/2018 Bae ........................ G09G 5/026
2019/0012978 A1 1/2019 Wen et al.
2022/0198985 A1 6/2022 Kim

FOREIGN PATENT DOCUMENTS

TW 201907377 2/2019

OTHER PUBLICATIONS

"Office Action of Taiwan Counterpart Application", issued on Aug. 5, 2024, p. 1-p. 7.

* cited by examiner

*Primary Examiner* — Sardis F Azongha
(74) *Attorney, Agent, or Firm* — JCIPRNET

(57) ABSTRACT

The disclosure provides a driving device for a self-luminous display panel and an operation method thereof. The driving device includes multiple GAMMA voltage circuits, a group of driving channels, and a routing circuit. Each driving channel is coupled to the corresponding GAMMA voltage circuit to receive a corresponding group of GAMMA voltages. Each driving channel converts corresponding sub-pixel data into a corresponding gray scale voltage based on the corresponding group of GAMMA voltages. The routing circuit is coupled to the output terminals of the driving channels. The routing circuit dynamically changes the coupling relationship between the driving channels and multiple data lines of the self-luminous display panel during different scanning periods.

20 Claims, 5 Drawing Sheets

DRIVING DEVICE FOR SELF-LUMINOUS DISPLAY PANEL AND OPERATION METHOD THEREOF

BACKGROUND

Technical Field

The disclosure relates to a display device, and particularly relates to a driving device for a self-luminous display panel and an operation method thereof.

Description of Related Art

With the popularization of micro organic light-emitting diode (μ-OLED) displays, the demand for high resolution is getting high, thereby increasing the quantity of source channels in a single integrated circuit (IC). In the application scenario of μ-OLED, the output voltages of the source channels are positive voltages. Generally speaking, a single GAMMA voltage circuit is configured in the single IC (the driving circuit of the OLED panel) to provide a single group of GAMMA voltages to all source channels (load circuits). Therefore, the load of the single GAMMA voltage circuit also increases as the quantity of the channels increases. When the output voltages of all source channels are flipped together, the disturbance of the source channel to the GAMMA voltage is an important issue. As the quantity of the source channels increases, the disturbance of the source channel to the GAMMA voltage becomes serious.

There are three main solutions in the past. First, the slew rate of the operational amplifier of the GAMMA voltage circuit (GAMMA source) is enhanced. However, this solution is not effective for the source channel near the outside of the IC (the source channel farther away from the GAMMA voltage circuit). Second, the width of the GAMMA voltage transmission wire between the GAMMA voltage circuit and the source channel is increased to reduce the resistance of the GAMMA voltage transmission wire. However, this solution sacrifices the wiring space of other wires and increases parasitic capacitance. Third, the resistance of the internal voltage-dividing resistor string (GAMMA resistor) of the GAMMA voltage circuit is reduced to increase the GAMMA current, thereby accelerating the stabilization of the GAMMA voltage after being disturbed by the source channel. However, this solution increases power consumption and does not help much for the source channel farther from the GAMMA voltage circuit.

It should be noted that the content of the related art section is used to help understand the disclosure. Some (or all) of the content disclosed in the related art section may not be known to persons with ordinary skill in the art. The content disclosed in the related art section does not mean that the content has been known to persons with ordinary skill in the art before the application of the disclosure.

SUMMARY

The disclosure provides a driving device for a self-luminous display panel and an operation method to reduce the disturbance of a driving channel to a GAMMA voltage.

In an embodiment of the disclosure, the driving device includes a plurality of GAMMA voltage circuit, a first group of driving channels, and a first routing circuit. Each GAMMA voltage circuit generates a group of GAMMA voltages. Each driving channel in the first group of driving channels is coupled to a corresponding GAMMA voltage circuit of the GAMMA voltage circuits to receive a group of corresponding GAMMA voltages. Each driving channel in the first group of driving channels converts corresponding sub-pixel data into a corresponding gray scale voltage based on the group of corresponding GAMMA voltages. The first routing circuit is coupled to an output terminal of each driving channel in the first group of driving channels to receive the corresponding gray scale voltage. The first routing circuit dynamically changes the coupling relationship between different driving channels in the first group of driving channels and different data lines in a first group of data lines of the self-luminous display panel during different scanning periods.

In an embodiment of the disclosure, the operation method includes the following. A plurality of GAMMA voltage circuit, a first group of driving channels, and a first routing circuit are provided, in which each of the GAMMA voltage circuits generates a group of GAMMA voltages, and each driving channel in a first group of driving channels is coupled to a corresponding GAMMA voltage circuit of the GAMMA voltage circuits to receive a group of corresponding GAMMA voltages. Each driving channel in the first group of driving channels converts corresponding sub-pixel data into a corresponding gray scale voltage based on the group of corresponding GAMMA voltages, in which the first routing circuit is coupled to an output terminal of each driving channel in the first group of driving channels to receive the corresponding gray scale voltage. The coupling relationship between different driving channels in the first group of driving channels and different data lines in a first group of data lines of the self-luminous display panel is dynamically changed by the first routing circuit during different scanning periods.

Based on the above, the various embodiments of the disclosure can generate a plurality of groups of GAMMA voltages by using a plurality of GAMMA voltage circuits based on the actual design. Ideally, the plurality of groups of GAMMA voltages have no difference from each other. Different GAMMA voltage circuits can supply GAMMA voltages to different driving channels. Based on this, although the quantity of the driving channels (load circuits) is large, in the embodiments of the disclosure, through increasing the quantity of the GAMMA voltage circuits, the output load of each GAMMA voltage circuit can be reduced, thereby reducing the disturbance of the driving channel to the GAMMA voltage.

In order to make the above-mentioned features and advantages of the disclosure more comprehensible, the detailed description of the embodiments are provided as follows with the accompanying drawings.

DESCRIPTION OF THE EMBODIMENTS

Figure 1:
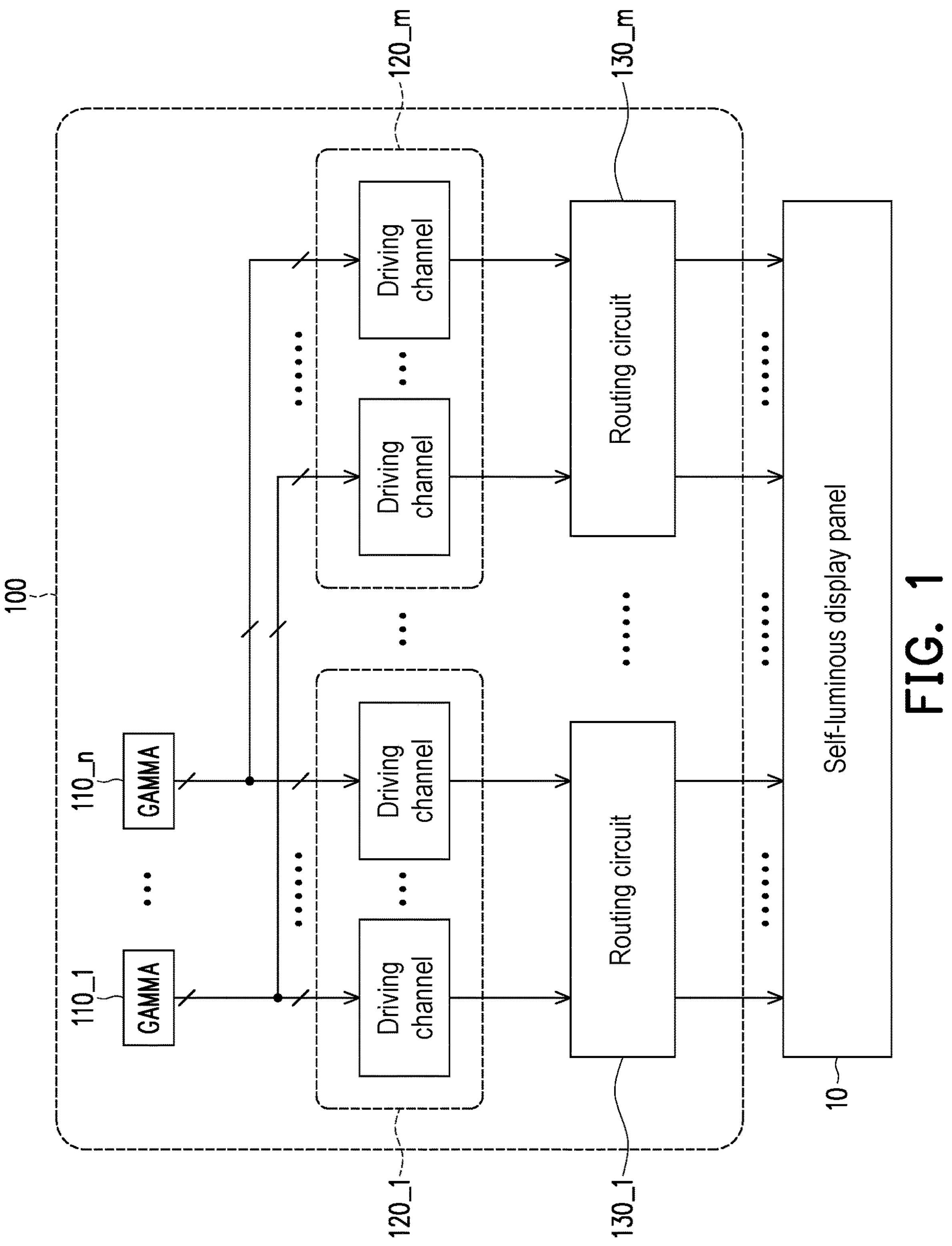
FIG. 1 is a schematic circuit block diagram of a driving device for a self-luminous display panel according to an embodiment of the disclosure.

The term "coupled (or connected)" used throughout the specification of the disclosure (including the appended claims) may refer to any direct or indirect means of connection. For example, if it is described that the first device is coupled (or connected) to the second device, it should be interpreted that the first device may be directly connected to the second device, or the first device may be connected through other devices or some kind of connection means. The terms "first" and "second" mentioned the specification of the disclosure (including the appended claims) are used to name the name of an element, or to distinguish different embodiments or ranges, and are not used to limit the upper limit or the lower limit of the quantity of elements, nor to limit the order of elements. In addition, wherever possible, elements/members/steps using the same reference numerals in the drawings and embodiments represent the same or similar parts. Elements/members/steps using the same reference numerals or using the same terms in different embodiments may refer to related descriptions.

Generally speaking, in the case of a single GAMMA voltage circuit being configured in a single integrated circuit (a driving device for a self-luminous display panel), as the quantity of the driving channels increases, the disturbance of the driving channel to the GAMMA voltage becomes serious. In the following embodiments, through increasing the quantity of the GAMMA voltage circuits, the output load of each GAMMA voltage circuit can be reduced, thereby reducing the disturbance of the driving channel to the GAMMA voltage.

FIG. 1 is a schematic circuit block diagram of a driving device 100 of a self-luminous display panel 10 according to an embodiment of the disclosure. This embodiment does not limit the specific implementation of the self-luminous display panel 10. The self-luminous display panel 10 may include an organic light-emitting diode (OLED) display panel or other display panels. For example, the self-luminous display panel 10 may include a micro OLED (or μ-OLED) display panel. The driving device 100 is coupled to a plurality of data lines of the self-luminous display panel 10.

Figure 2:
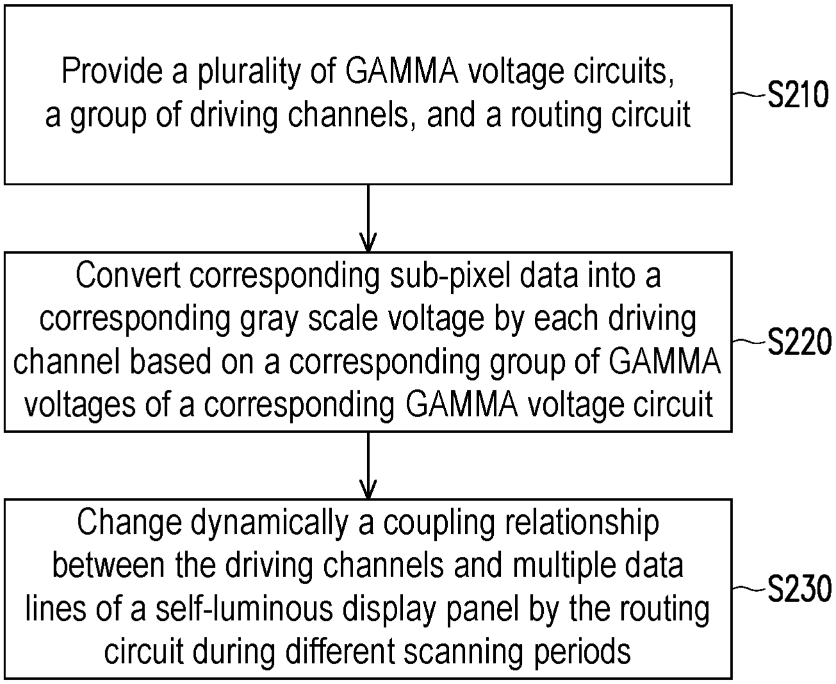
FIG. 2 is a schematic flowchart of an operation method of the driving device according to an embodiment of the disclosure.

FIG. 2 is a schematic flowchart of an operation method of the driving device according to an embodiment of disclosure. Please refer to FIG. 1 and FIG. 2. In Step S210, a plurality of GAMMA voltage circuits, a group of driving channels, and a routing circuit are provided in the driving device 100. In the embodiment shown in FIG. 1, the driving device 100 includes a plurality of GAMMA voltage circuits, a plurality of driving channels, and a plurality of routing circuits. The quantity of driving channels may be any integer determined according to the actual design. It is assumed here that the quantity of GAMMA voltage circuits is n, such as GAMMA voltage circuits 110_1 to 110_*n* shown in FIG. 1. The quantity n of GAMMA voltage circuits may be any integer greater than 1 determined according to the actual design. The n GAMMA voltage circuits 110_1 to 110_*n* generate n groups of GAMMA voltages. Ideally, the n groups of GAMMA voltages have no difference from each other.

Based on the quantity of the GAMMA voltage circuits 110_1 to 110_*n*, all driving channels of the driving device 100 may be grouped into a plurality of groups of driving channels, such as driving channel groups 120_1 to 120_*m* shown in FIG. 1. The group quantity m of the driving channel groups may be any integer determined according to the actual design. Each driving channel group 120_1 to 120_*m* includes a maximum of n driving channels. In the same group of driving channels (such as the driving channel group 120_1), each driving channel is coupled to a corresponding GAMMA voltage circuit in the GAMMA voltage circuits 110_1 to 110_*n* to receive a group of corresponding GAMMA voltages. That is, in the same group of driving channels, different driving channels are coupled to different GAMMA voltage circuits. Therefore, different GAMMA voltage circuits may supply GAMMA voltages to different driving channels in the same driving channel group. In Step S220, corresponding sub-pixel data may be converted into a corresponding gray scale voltage by each driving channel based on the corresponding group of GAMMA voltages received.

Each GAMMA voltage circuit 110_1 to 110_*n* generates a group of GAMMA voltages. Ideally, the n groups of GAMMA voltages generated by the GAMMA voltage circuits 110_1 to 110_*n* have no difference from each other. Based on errors of actual circuits or other factors, the n groups of GAMMA voltages generated by the GAMMA voltage circuits 110_1 to 110_*n* may have a mismatch problem. In order to solve the mismatch problem generated by different groups of GAMMA voltages of the different GAMMA voltage circuits 110_1 to 110_*n*, a routing circuit is configured for each group of driving channels in the embodiment shown in FIG. 1, such as routing circuits 130_1 to 130_*m* shown in FIG. 1.

Each routing circuit (such as the routing circuit 1301) is coupled to an output terminal of each driving channel in different groups of driving channels to receive the corresponding gray scale voltage. Taking the routing circuit 130_1 as an example (other routing circuits may be analogized), in Step S230, the coupling relationship between different driving channels in the driving channel group 120_1 and different data lines in a first group of data lines of the self-luminous display panel 10 may be dynamically changed by the routing circuit 130_1 during different scanning periods. By analogy, the muting circuit 130_*m* may dynamically change the coupling relationship between different driving channels in the driving channel group 120_*m* and different data lines in an mth group of data lines of the self-luminous display panel 10 during the different scanning periods. For other driving channel groups and other routing circuits shown in FIG. 1, reference may be made to the relevant descriptions of the driving channel group 120_1 and the routing circuit 1301, so details are not repeated here. Therefore, each routing circuit 130_1 to 130_*m* can implement a chopper function between a plurality of adjacent data lines. The routing circuits 130_1 to 130_*m* can allow the output of each driving channel to be transmitted to different data lines at different times, thereby reducing the difference in visual effects caused by different groups of GAMMA voltage.

Figure 3:
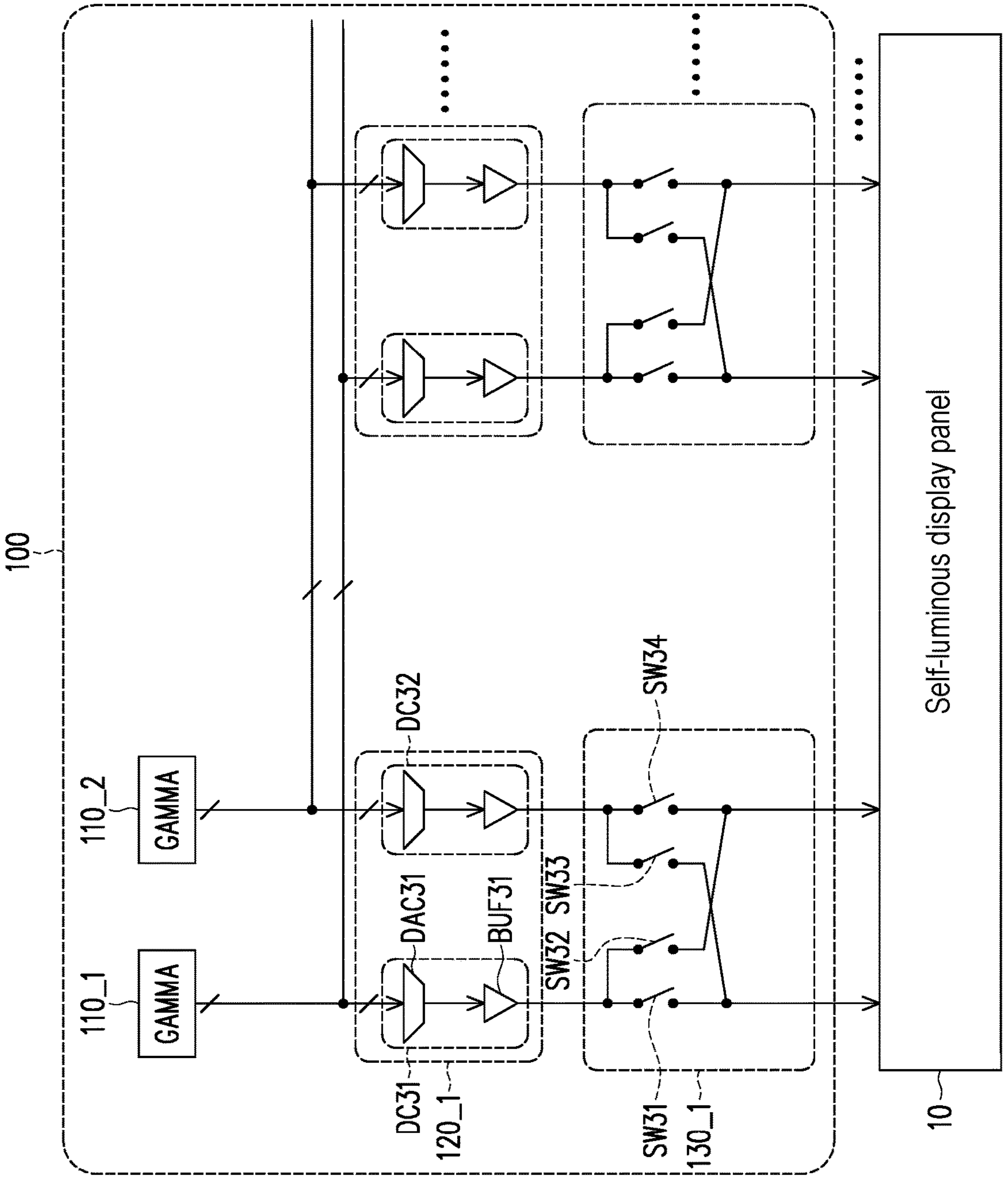
FIG. 3 is a schematic circuit diagram of a driving channel and a routing circuit according to an embodiment of the disclosure.

FIG. 3 is a schematic circuit diagram of the driving channel group 120_1 and the routing circuit 130_1 according to an embodiment of the disclosure. The driving channel group 120_1 and the routing circuit 130_1 shown in FIG. 3 may be used as one of many implementation examples of the driving channel group 1201 and the routing circuit 130_1 shown in FIG. 1. For other driving channel groups and other routing circuits shown in FIG. 1 and FIG. 3, reference may be made to the relevant descriptions of the driving channel group 1201 and the routing circuit 130_1 shown in FIG. 3, so details are not repeated here.

In the embodiment shown in FIG. 3, the driving device 100 includes two GAMMA voltage circuits 110_1 and 110_2, and the driving channel group 1201 includes two driving channels DC31 and DC32. The driving channel DC31 is coupled to the GAMMA voltage circuit 110_1 to receive a GAMMA voltage group (a first group of GAMMA voltages), and the driving channel DC32 is coupled to the GAMMA voltage circuit 110_2 to receive another GAMMA voltage group (a second group of GAMMA voltages). During a first scanning period, the routing circuit 130_1 couples the output terminal of the driving channel DC31 to the first data line in the first group of data lines of the self-luminous display panel 10, and the routing circuit 1301 couples the output terminal of the driving channel DC32 to the second data line in the first group of data lines of the self-luminous display panel 10. During a second scanning period after the first scanning period, the routing circuit 130_1 couples the output terminal of the driving channel DC31 to the second data line in the first group of data lines of the self-luminous display panel 10, and the routing circuit 130_1 couples the output terminal of the driving channel DC32 to the first data line in the first group of data lines of the self-luminous display panel 10.

In the embodiment shown in FIG. 3, the driving channel DC31 includes a digital-to-analog converter DAC31 and a buffer BUF31. For other driving channels (for example, the driving channel DC32) shown in FIG. 3, reference may be made to the relevant descriptions of the driving channel DC31 shown in FIG. 3, so details are not repeated here. The digital-to-analog converter DAC31 is coupled to the corresponding GAMMA voltage circuit 110_1 in different GAMMA voltage circuits to receive a group of corresponding GAMMA voltages. The digital-to-analog converter DAC31 may convert sub-pixel data into a gray scale voltage based on the corresponding group of GAMMA voltages provided by the GAMMA voltage circuit 110_1. The input terminal of the buffer BUF31 is coupled to the output terminal of the digital-to-analog converter DAC31 to receive the gray scale voltage. The output terminal of the buffer BUF31 is coupled to the routing circuit 130_1.

In the embodiment shown in FIG. 3, the routing circuit 130_1 includes a switch SW31, a switch SW32, a switch SW33, and a switch SW34. A first terminal of the switch SW31 is coupled to the output terminal of the driving channel DC31. A second terminal of the switch SW31 is coupled to the first data line in the first group of data lines of the self-luminous display panel 10. A first terminal of the switch SW32 is coupled to the output terminal of the driving channel DC31. A second terminal of the switch SW32 is coupled to the second data line in the first group of data lines of the self-luminous display panel 10. A first terminal of the switch SW33 is coupled to the output terminal of the driving channel DC32. A second terminal of the switch SW33 is coupled to the first data line in the first group of data lines of the self-luminous display panel 10. A first terminal of the switch SW34 is coupled to the output terminal of the driving channel DC32. A second terminal of the switch SW34 is coupled to the second data line in the first group of data lines of the self-luminous display panel 10. During the first scanning period, the switch SW31 and the switch SW34 are turned on and the switch SW32 and the switch SW33 are turned off. During the second scanning period, the switch SW31 and the switch SW34 are turned off, and the switch SW32 and the switch SW33 are turned on. Next, for the operation during the odd-numbered scanning period, reference may be made to the relevant descriptions of the first scanning period, and for the operation during the even-numbered scanning period, reference may be made to the relevant descriptions of the second scanning period, so details are not repeated here.

Figure 4:
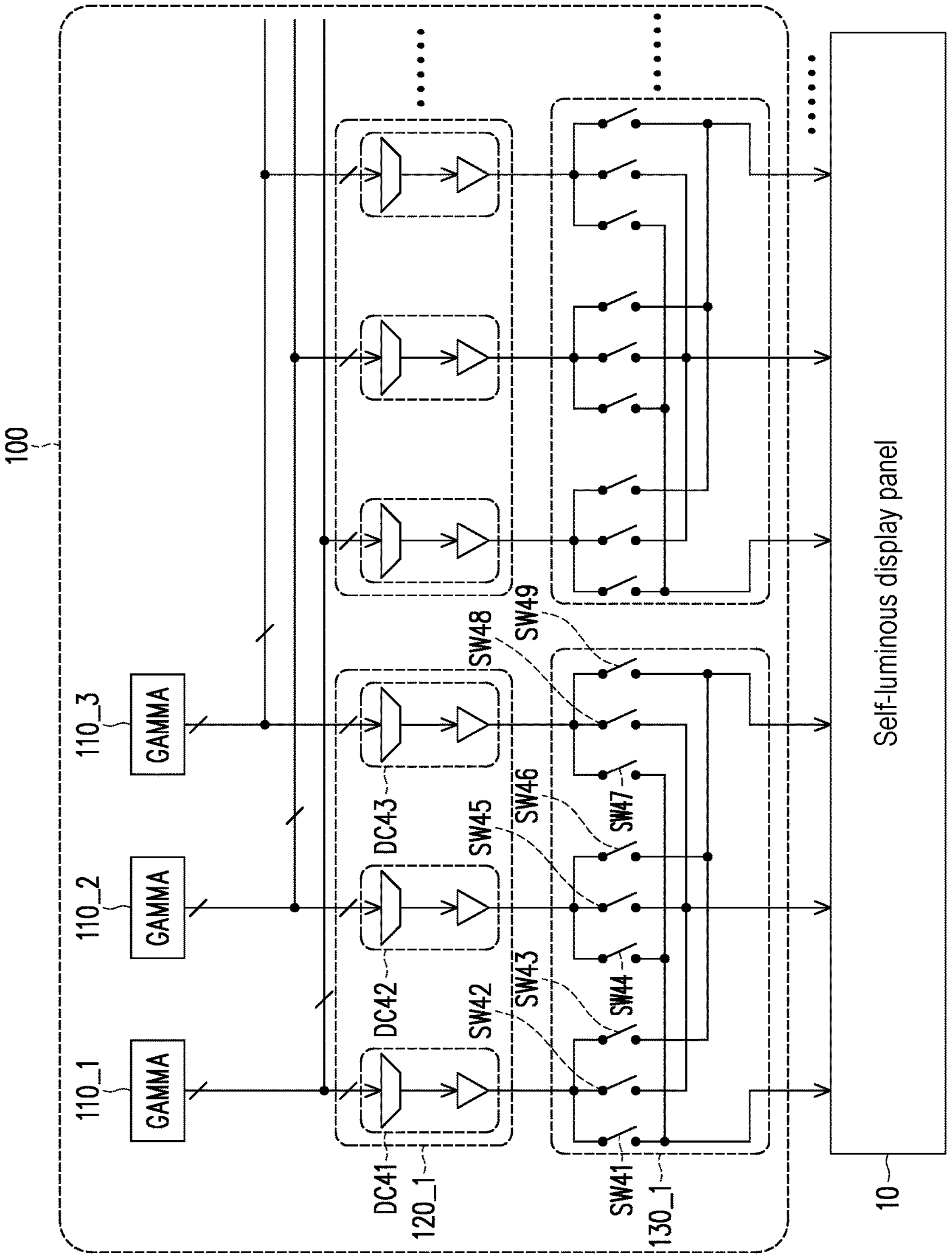
FIG. 4 is a schematic circuit diagram of a muting circuit according to another embodiment of the disclosure.

FIG. 4 is a schematic circuit diagram of the routing circuit 130_1 according to another embodiment of the disclosure. The driving channel group 1201 and the routing circuit 130_1 shown in FIG. 4 may be used as one of many implementation examples of the driving channel group 1201 and the routing circuit 130_1 shown in FIG. 1. For other driving channel groups and other routing circuits shown in FIG. 1 and FIG. 4, reference may be made to the relevant descriptions of the driving channel group 120_1 and the routing circuit 130_1 shown in FIG. 4, so details are not repeated here.

In the embodiment shown in FIG. 4, the driving device 100 includes three GAMMA voltage circuits 110_1, 110_2, and 110_3, and the driving channel group 120_1 includes three driving channels DC41, DC42, and DC43. For the driving channels DC41, DC42, and DC43 shown in FIG. 4 and other driving channels, reference may be made to the relevant descriptions of the driving channel DC31 shown in FIG. 3, so details are not repeated here. The driving channel DC41 is coupled to the GAMMA voltage circuit 110_1 to receive a GAMMA voltage group (the first group of GAMMA voltages), the driving channel DC42 is coupled to the GAMMA voltage circuit 110_2 to receive another GAMMA voltage group (the second group of GAMMA voltages), and the driving channel DC43 is coupled to the GAMMA voltage circuit 110_3 to receive still another GAMMA voltage group (a third group of GAMMA voltages).

During the first scanning period, the routing circuit 130_1 couples the output terminal of the driving channel DC41, the output terminal of the driving channel DC42, and the output terminal of the driving channel DC43 to the first data line, the second data line, and the third data line in the first group of data lines of the self-luminous display panel 10 in a one-to-one manner based on a first coupling relationship. During the second scanning period after the first scanning period, the muting circuit 130_1 couples the output terminals of the driving channels DC41, DC42, and DC43 to the first data line, the second data line, and the third data line in the first group of data lines of the self-luminous display panel 10 in the one-to-one manner based on a second coupling relationship different from the first coupling relationship. During a third scanning period after the second scanning period, the muting circuit 130_1 couples the output terminals of the driving channels DC41, DC42, and DC43 to the first data line, the second data line, and the third data line in the first group of data lines of the self-luminous display panel 10 in the one-to-one manner based on a third coupling relationship different from the first coupling relationship and the second coupling relationship.

The first coupling relationship, the second coupling relationship, and the third coupling relationship may be determined according to the actual design. For example (but not limited thereto), during the first scanning period, the routing circuit 130_1 couples the output terminal of the driving channel DC41 to the first data line in the first group of data lines of the self-luminous display panel 10, couples the output terminal of the driving channel DC42 to the second data line in the first group of data lines of the self-luminous display panel 10, and couples the output terminal of the driving channel DC43 to the third data line in the first group of data lines of the self-luminous display panel 10. During the second scanning period, the routing circuit 130_1 couples the output terminal of the driving channel DC41 to the third data line in the first group of data lines of the self-luminous display panel 10, couples the output terminal of the driving channel DC42 to the first data line in the first group of data lines of the self-luminous display panel 10, and couples the output terminal of the driving channel DC43 to the second data line in the first group of data lines of the self-luminous display panel 10. During the third scanning period, the routing circuit 130_1 couples the output terminal of the driving channel DC41 to the second data line in the first group of data lines of the self-luminous display panel 10, couples the output terminal of the driving channel DC42 to the third data line in the first group of data lines of the self-luminous display panel 10, and couples the output terminal of the driving channel DC43 to the first data line in the first group of data lines of the self-luminous display panel 10.

In the embodiment shown in FIG. 4, the routing circuit 130_1 includes a switch SW41, a switch SW42, a switch SW43, a switch SW44, a switch SW45, a switch SW46, a switch SW47, a switch SW48, and a switch SW49. The first terminal of the switch SW41 is coupled to the output terminal of the driving channel DC41. The second terminal of the switch SW41 is coupled to the first data line in the first group of data lines of the self-luminous display panel 10. The first terminal of the switch SW42 is coupled to the output terminal of the driving channel DC41. The second terminal of the switch SW42 is coupled to the second data line in the first group of data lines of the self-luminous display panel 10. The first terminal of the switch SW43 is coupled to the output terminal of the driving channel DC41. The second terminal of the switch SW43 is coupled to the third data line in the first group of data lines of the self-luminous display panel 10. The first terminal of the switch SW44 is coupled to the output terminal of the driving channel DC42. The second terminal of the switch SW44 is coupled to the first data line in the first group of data lines of the self-luminous display panel 10. The first terminal of the switch SW45 is coupled to the output terminal of the driving channel DC42. The second terminal of the switch SW45 is coupled to the second data line in the first group of data lines of the self-luminous display panel 10. The first terminal of the switch SW46 is coupled to the output terminal of the driving channel DC42. The second terminal of the switch SW46 is coupled to the third data line in the first group of data lines of the self-luminous display panel 10. The first terminal of the switch SW47 is coupled to the output terminal of the driving channel DC43. The second terminal of the switch SW47 is coupled to the first data line in the first group of data lines of the self-luminous display panel 10. The first terminal of the switch SW48 is coupled to the output terminal of the driving channel DC43. The second terminal of the switch SW48 is coupled to the second data line in the first group of data lines of the self-luminous display panel 10. The first terminal of the switch SW49 is coupled to the output terminal of the driving channel DC43. The second terminal of the switch SW49 is coupled to the third data line in the first group of data lines of the self-luminous display panel 10.

During the first scanning period, the switches SW41, SW45, and SW49 are turned on, and the switches SW42, SW43, SW44, SW46, SW47, and SW48 are turned off. During the second scanning period, the switches SW43, SW44, and SW48 are turned on, and the switches SW41, SW42, SW45, SW46, SW47, and SW49 are turned off. During the third scanning period, the switches SW42, SW46, and the SW47 are turned on, and the switches SW41, SW43, SW44, SW45, SW48, and SW49 are turned off. Next, for the operation during the (3*i+1)th scanning period, reference may be made to the relevant descriptions of the first scanning period (i is a positive integer greater than 0), for the operation during the (3*i+2)th scanning period, reference may be made to the relevant descriptions of the second scanning period, and for the operation during the (3*i+3)th scanning period, reference may be made to the relevant descriptions of the third scanning period, so details are not repeated here.

Figure 5:
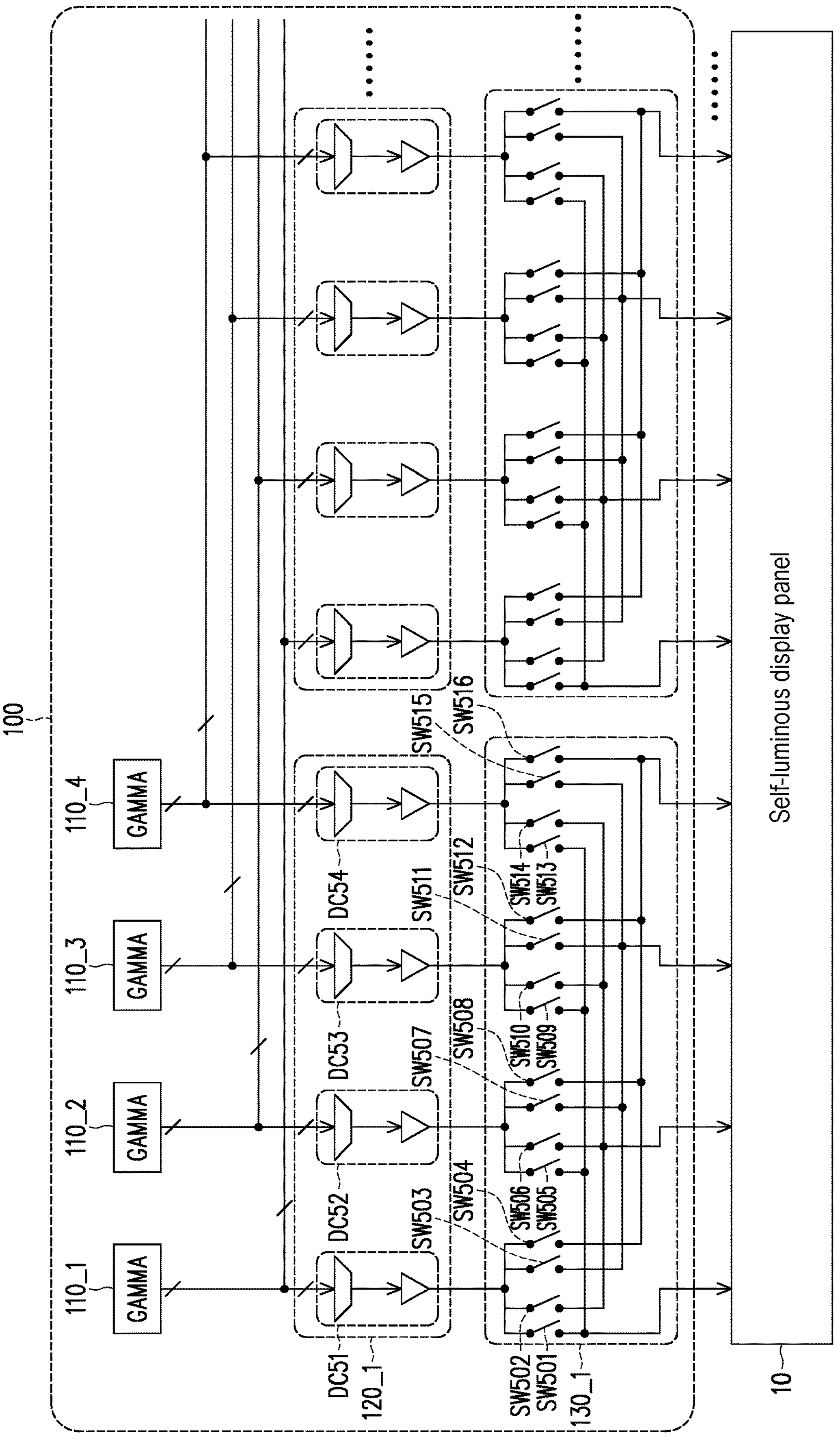
FIG. 5 is a schematic circuit diagram of a muting circuit according to still another embodiment of the disclosure.

FIG. 5 is a schematic circuit diagram of the routing circuit 130_1 according to still another embodiment of the disclosure. The driving channel group 120_1 and the routing circuit 130_1 shown in FIG. 5 may be used as one of many implementation examples of the driving channel group 120_1 and the routing circuit 130_1 shown in FIG. 1. For other driving channel groups and other routing circuits shown in FIG. 1 and FIG. 5, reference may be made to the relevant descriptions of the driving channel group 120_1 and the routing circuit 130_1 shown in FIG. 5, so details are not repeated here.

In the embodiment shown in FIG. 5, the driving device 100 includes four GAMMA voltage circuits 110_1, 110_2, 110_3, and 110_4, and the driving channel group 120_1 includes four driving channels DC51, DC52, DC53, and DC54. For the driving channels DC51, DC52, DC53, and DC54 shown in FIG. 5 and other driving channels, reference may be made to the relevant descriptions of the driving channel DC31 shown in FIG. 3 and be analogized, so details are not repeated here. The driving channel DC51 is coupled to the GAMMA voltage circuit 110_1 to receive a GAMMA voltage group (the first group of GAMMA voltages). The driving channel DC52 is coupled to the GAMMA voltage circuit 110_2 to receive another GAMMA voltage group (the second group of GAMMA voltages). The driving channel DC53 is coupled to the GAMMA voltage circuit 110_3 to receive still another GAMMA voltage group (the third group of GAMMA voltages). The driving channel DC54 is coupled to the GAMMA voltage circuit 110_4 to receive yet another GAMMA voltage group (a fourth group of GAMMA voltages).

During the first scanning period, the routing circuit 130_1 couples the output terminal of the driving channel DC51, the output terminal of the driving channel DC52, the output terminal of the driving channel DC53, and the output terminal of the driving channel DC54 to the first data line, the second data line, the third data line, and a fourth data line in the first group of data lines of the self-luminous display panel 10 in the one-to-one manner based on the first coupling relationship. During the second scanning period after the first scanning period, the routing circuit 130_1 couples the output terminals of the driving channels DC51, DC52, DC53, and DC54 to the first data line, the second data line, the third data line, and the fourth data line in the first group of data lines of the self-luminous display panel 10 in the one-to-one manner based on the second coupling relationship different from the first coupling relationship. During the third scanning period after the second scanning period, the routing circuit 130_1 couples the output terminals of the driving channels DC51, DC52, DC53, and DC54 to the first data line, the second data line, the third data line, and the fourth data line in the first group of data lines of the self-luminous display panel 10 in the one-to-one manner based on the third coupling relationship different from the first coupling relationship and the second coupling relationship. During a fourth scanning period after the third scanning period, the routing circuit 130_1 couples the output terminals of the driving channels DC51, DC52, DC53, and DC54 to the first data line, the second data line, the third data line, and the fourth data line in the first group of data lines of the self-luminous display panel 10 in the one-to-one manner based on a fourth coupling relationship different from the first coupling relationship, the second coupling relationship, and the third coupling relationship.

The first coupling relationship, the second coupling relationship, the third coupling relationship, and the fourth coupling relationship may be determined according to the actual design. For example (but not limited thereto), during the first scanning period, the routing circuit 130_1 couples the output terminal of the driving channel DC51 to the first data line in the first group of data lines of the self-luminous display panel 10, couples the output terminal of the driving channel DC52 to the second data line in the first group of data lines of the self-luminous display panel 10, couples the output terminal of the driving channel DC53 to the third data line in the first group of data lines of the self-luminous display panel 10, and couples the output terminal of the driving channel DC54 to the fourth data line in the first group of data lines of the self-luminous display panel 10. During the second scanning period, the routing circuit 1301 couples the output terminal of the driving channel DC51 to the fourth data line in the first group of data lines of the self-luminous display panel 10, couples the output terminal of the driving channel DC52 to the first data line in the first group of data lines of the self-luminous display panel 10, couples the output terminal of the driving channel DC53 to the second data line in the first group of data lines of the self-luminous display panel 10, and couples the output terminal of the driving channel DC54 to the third data line in the first group of data lines of the self-luminous display panel 10. During the third scanning period, the routing circuit 130_1 couples the output terminal of the driving channel DC51 to the third data line in the first group of data lines of the self-luminous display panel 10, couples the output terminal of the driving channel DC52 to the fourth data line in the first group of data lines of the self-luminous display panel 10, couples the output terminal of the driving channel DC53 to the first data line in the first group of data lines of the self-luminous display panel 10, and couples the output terminal of the driving channel DC54 to the second data line in the first group of data lines of the self-luminous display panel 10. During the fourth scanning period, the routing circuit 130_1 couples the output terminal of the driving channel DC51 to the second data line in the first group of data lines of the self-luminous display panel 10, couples the output terminal of the driving channel DC52 to the third data line in the first group of data lines of the self-luminous display panel 10, couples the output terminal of the driving channel DC53 to the fourth data line in the first group of data lines of the self-luminous display panel 10, and couples the output terminal of the driving channel DC54 to the first data line in the first group of data lines of the self-luminous display panel 10.

In the embodiment shown in FIG. 5, the routing circuit 130_1 includes a switch SW501, a switch SW502, a switch SW503, a switch SW504, a switch SW505, a switch SW506, a switch SW507, a switch SW508, a switch SW509, a switch SW510, a switch SW511, a switch SW512, a switch SW513, a switch SW514, a switch SW515, and a switch SW516. The first terminal of the switch SW501 is coupled to the output terminal of the driving channel DC51. The second terminal of the switch SW501 is coupled to the first data line in the first group of data lines of the self-luminous display panel 10. The first terminal of the switch SW502 is coupled to the output terminal of the driving channel DC51. The second terminal of the switch SW502 is coupled to the second data line in the first group of data lines of the self-luminous display panel 10. The first terminal of the switch SW503 is coupled to the output terminal of the driving channel DC51. The second terminal of the switch SW503 is coupled to the third data line in the first group of data lines of the self-luminous display panel 10. The first terminal of the switch SW504 is coupled to the output terminal of the driving channel DC51. The second terminal of the switch SW504 is coupled to the fourth data line in the first group of data lines of the self-luminous display panel 10. The first terminal of the switch SW505 is coupled to the output terminal of the driving channel DC52. The second terminal of the switch SW505 is coupled to the first data line in the first group of data lines of the self-luminous display panel 10. The first terminal of the switch SW506 is coupled to the output terminal of the driving channel DC52. The second terminal of the switch SW506 is coupled to the second data line in the first group of data lines of the self-luminous display panel 10. The first terminal of the switch SW507 is coupled to the output terminal of the driving channel DC52. The second terminal of the switch SW507 is coupled to the third data line in the first group of data lines of the self-luminous display panel 10. The first terminal of the switch SW508 is coupled to the output terminal of the driving channel DC52. The second terminal of the switch SW508 is coupled to the fourth data line in the first group of data lines of the self-luminous display panel 10. The first terminal of the switch SW509 is coupled to the output terminal of the driving channel DC53. The second terminal of the switch SW509 is coupled to the first data line in the first group of data lines of the self-luminous display panel 10. The first terminal of the switch SW510 is coupled to the output terminal of the driving channel DC53. The second terminal of the switch SW510 is coupled to the second data line in the first group of data lines of the self-luminous display panel 10. The first terminal of the switch SW511 is coupled to the output terminal of the driving channel DC53. The second terminal of the switch SW511 is coupled to the third data line in the first group of data lines of the self-luminous display panel 10. The first terminal of the switch SW512 is coupled to the output terminal of the driving channel DC53. The second terminal of the switch SW512 is coupled to the fourth data line in the first group of data lines of the self-luminous display panel 10. The first terminal of the switch SW513 is coupled to the output terminal of the driving channel DC54. The second terminal of the switch SW513 is coupled to the first data line in the first group of data lines of the self-luminous display panel 10. The first terminal of the switch SW514 is coupled to the output terminal of the driving channel DC54. The second terminal of the switch SW514 is coupled to the second data line in the first group of data lines of the self-luminous display panel 10. The first terminal of the switch SW515 is coupled to the output terminal of the driving channel DC54. The second terminal of the switch SW515 is coupled to the third data line in the first group of data lines of the self-luminous display panel 10. The first terminal of the switch SW516 is coupled to the output terminal of the driving channel DC54. The second terminal of the switch SW516 is coupled to the fourth data line in the first group of data lines of the self-luminous display panel 10.

During the first scanning period, the switches SW501, SW506, SW511, and SW516 are turned on and the switches SW502, SW503, SW504, SW505, SW507, SW508, SW509, SW510, SW512, SW513, SW514, and SW515 are turned off. During the second scanning period, the switches SW504, SW505, SW510, and SW515 are turned on and the switches SW501, SW502, SW503, SW506, SW507, SW508, SW509, SW511, SW512, SW513, SW514, and SW516 are turned off. During the third scanning period, the switches SW503, SW508, SW509, and SW514 are turned on, and the switches SW501, SW502, SW504, SW505, SW506, SW507, SW510, SW511, SW512, SW513, SW515, and SW516 are turned off. During the fourth scanning period, the switches SW502, SW507, SW512, and SW513 are turned on, and the switches SW501, SW503, SW504, SW505, SW506, SW508, SW509, SW510, SW511, SW514, SW515, and SW516 are turned off. Next, for the operation during the (4*i+1)th scanning period, reference may be made to the relevant descriptions of the first scanning period (i is a positive integer greater than 0), for the operation during the (4*i+2)th scanning period, reference may be made to the relevant descriptions of the second scanning period, for the operation during the (4*i+3)th scanning period, reference may be made to the relevant descriptions of the third scanning period, and for the operation during the (4*i+4)th scanning period, reference may be made to the relevant descriptions of the fourth scanning period, so details are not repeated here.

In summary, the various embodiments can generate the plurality of groups of GAMMA voltages by using the plurality of GAMMA voltage circuits based on the actual design. Ideally, the plurality of groups of GAMMA voltages have no difference from each other. Different GAMMA voltage circuits can supply GAMMA voltages to different driving channels. Based on this, although the quantity of the driving channels (load circuits) is large, in the above-mentioned embodiments, through increasing the quantity of the GAMMA voltage circuits, the output load of each GAMMA voltage circuit can be reduced, thereby reducing the disturbance of the driving channel to the GAMMA voltage.

Although the disclosure has been disclosed as above with the embodiments, the embodiments are not used to limit the disclosure. Persons with ordinary knowledge in the technical field may make some changes and modifications without departing from the spirit and scope of the disclosure. Therefore, the scope of protection of the disclosure shall be defined by the appended claims.

What is claimed is:

1. A driving device for a self-luminous display panel, comprising:

a plurality of GAMMA voltage circuits, comprising a first GAMMA voltage circuit and a second GAMMA voltage circuit, wherein each of the GAMMA voltage circuits generates a group of GAMMA voltages, wherein voltage levels of a first group of GAMMA voltages generated by the first GAMMA voltage circuit are the same as voltage levels of a second group of GAMMA voltages generated by the second GAMMA voltage circuit;

a first group of driving channels, wherein each driving channel in the first group of driving channels is coupled to a corresponding GAMMA voltage circuit in the GAMMA voltage circuits to receive a corresponding group of GAMMA voltages, and each driving channel in the first group of driving channels converts corresponding sub-pixel data into a corresponding gray scale voltage based on the corresponding group of GAMMA voltages; and a first routing circuit coupled to an output terminal of each driving channel in the first group of driving channels to receive the corresponding gray scale voltage, wherein the first routing circuit dynamically changes a coupling relationship between different driving channels in the first group of driving channels and different data lines in a first group of data lines of the self-luminous display panel during different scanning periods.

2. The driving device as claimed in claim 1, wherein the first group of driving channels comprises a first driving channel and a second driving channel, the first driving channel is coupled to the first GAMMA voltage circuit to receive the first group of GAMMA voltages, and the second driving channel is coupled to the second GAMMA voltage circuit to receive the second group of GAMMA voltages, during a first scanning period, the first routing circuit couples an output terminal of the first driving channel to a first data line in the first group of data lines and couples an output terminal of the second driving channel to a second data line in the first group of data lines; and during a second scanning period after the first scanning period, the first routing circuit couples the output terminal of the first driving channel to the second data line and couples the output terminal of the second driving channel to the first data line.

3. The driving device as claimed in claim 2, wherein the first routing circuit comprises:

a first switch having a first terminal coupled to the output terminal of the first driving channel, wherein a second terminal of the first switch is coupled to the first data line in the first group of data lines of the self-luminous display panel;

a second switch having a first terminal coupled to the output terminal of the first driving channel, wherein a second terminal of the second switch is coupled to the second data line in the first group of data lines of the self-luminous display panel;

a third switch having a first terminal coupled to the output terminal of the second driving channel, wherein a second terminal of the third switch is coupled to the first data line in the first group of data lines of the self-luminous display panel; and a fourth switch having a first terminal coupled to the output terminal of the second driving channel, wherein a second terminal of the fourth switch is coupled to the second data line in the first group of data lines of the self-luminous display panel, wherein the first switch and the fourth switch are turned on and the second switch and the third switch are turned off during the first scanning period, and the first switch and the fourth switch are turned off and the second switch and the third switch are turned on during the second scanning period.

4. The driving device as claimed in claim 1, wherein the plurality of GAMMA voltage circuits further comprise a third GAMMA voltage circuit, the first group of driving channels comprises a first driving channel, a second driving channel, and a third driving channel, the first driving channel is coupled to the first GAMMA voltage circuit to receive the first group of GAMMA voltages, the second driving channel is coupled to the second GAMMA voltage circuit to receive the second group of GAMMA voltages, and the third driving channel is coupled to the third GAMMA voltage circuit to receive a third group of GAMMA voltages, during a first scanning period, the first routing circuit couples an output terminal of the first driving channel, an output terminal of the second driving channel, and an output terminal of the third driving channel to a first data line, a second data line, and a third data line in the first group of data lines in a one-to-one manner based on a first coupling relationship;

during a second scanning period after the first scanning period, the first routing circuit couples the output terminals of the first driving channel, the second driving channel, and the third driving channel to the first data line, the second data line, and the third data line in the one-to-one manner based on a second coupling relationship different from the first coupling relationship; and during a third scanning period after the second scanning period, the first routing circuit couples the output terminals of the first driving channel, the second driving channel, and the third driving channel to the first data line, the second data line, and the third data line in the one-to-one manner based on a third coupling relationship different from the first coupling relationship and the second coupling relationship.

5. The driving device as claimed in claim 4, wherein, during the first scanning period, the first routing circuit couples the output terminal of the first driving channel to the first data line, couples the output terminal of the second driving channel to the second data line, and couples the output terminal of the third driving channel to the third data line;

during the second scanning period, the first routing circuit couples the output terminal of the first driving channel to the third data line, couples the output terminal of the second driving channel to the first data line, and couples the output terminal of the third driving channel to the second data line; and during the third scanning period, the first routing circuit couples the output terminal of the first driving channel to the second data line, couples the output terminal of the second driving channel to the third data line, and couples the output terminal of the third driving channel to the first data line.

6. The driving device as claimed in claim 4, wherein the first routing circuit comprises:

a first switch having a first terminal coupled to the output terminal of the first driving channel, wherein a second terminal of the first switch is coupled to the first data line in the first group of data lines of the self-luminous display panel;

a second switch having a first terminal coupled to the output terminal of the first driving channel, wherein a second terminal of the second switch is coupled to the second data line in the first group of data lines of the self-luminous display panel;

a third switch having a first terminal coupled to the output terminal of the first driving channel, wherein a second terminal of the third switch is coupled to the third data line in the first group of data lines of the self-luminous display panel;

a fourth switch having a first terminal coupled to the output terminal of the second driving channel, wherein a second terminal of the fourth switch is coupled to the first data line in the first group of data lines of the self-luminous display panel;

a fifth switch having a first terminal coupled to the output terminal of the second driving channel, wherein a second terminal of the fifth switch is coupled to the second data line in the first group of data lines of the self-luminous display panel;

a sixth switch having a first terminal coupled to the output terminal of the second driving channel, wherein a second terminal of the sixth switch is coupled to the third data line in the first group of data lines of the self-luminous display panel;

a seventh switch having a first terminal coupled to the output terminal of the third driving channel, wherein a second terminal of the seventh switch is coupled to the first data line in the first group of data lines of the self-luminous display panel;

an eighth switch having a first terminal coupled to the output terminal of the third driving channel, wherein a second terminal of the eighth switch is coupled to the second data line in the first group of data lines of the self-luminous display panel; and a ninth switch having a first terminal coupled to the output terminal of the third driving channel, wherein a second terminal of the ninth switch is coupled to the third data line in the first group of data lines of the self-luminous display panel.

7. The driving device as claimed in claim 6, wherein, during the first scanning period, the first switch, the fifth switch, and the ninth switch are turned on, and the second switch, the third switch, the fourth switch, the sixth switch, the seventh switch, and the eighth switch are turned off;

during the second scanning period, the third switch, the fourth switch, and the eighth switch are turned on, and the first switch, the second switch, the fifth switch, the sixth switch, the seventh switch, and the ninth switch are turned off; and during the third scanning period, the second switch, the sixth switch, and the seventh switch are turned on, and the first switch, the third switch, the fourth switch, the fifth switch, the eighth switch, and the ninth switch are turned off.

8. The driving device as claimed in claim 1, wherein the plurality of GAMMA voltage circuits further comprise a third GAMMA voltage circuit, and a fourth GAMMA voltage circuit, the first group of driving channels comprises a first driving channel, a second driving channel, a third driving channel, and a fourth driving channel, the first driving channel is coupled to the first GAMMA voltage circuit to receive the first group of GAMMA voltages, the second driving channel is coupled to the second GAMMA voltage circuit to receive the second group of GAMMA voltages, the third driving channel is coupled to the third GAMMA voltage circuit to receive a third group of GAMMA voltages, the fourth driving channel is coupled to the fourth GAMMA voltage circuit to receive a fourth group of GAMMA voltages, during a first scanning period, the first routing circuit couples an output terminal of the first driving channel, an output terminal of the second driving channel, an output terminal of the third driving channel, and an output terminal of the fourth driving channel to a first data line, a second data line, a third data line, and a fourth data line in the first group of data lines in a one-to-one manner based on a first coupling relationship;

during a second scanning period after the first scanning period, the first routing circuit couples the output terminals of the first driving channel, the second driving channel, the third driving channel, and the fourth driving channel to the first data line, the second data line, the third data line, and the fourth data line in the one-to-one manner based on a second coupling relationship different from the first coupling relationship;

during a third scanning period after the second scanning period, the first routing circuit couples the output terminals of the first driving channel, the second driving channel, the third driving channel, and the fourth driving channel to the first data line, the second data line, the third data line, and the fourth data line in the one-to-one manner based on a third coupling relationship different from the first coupling relationship and the second coupling relationship; and during a fourth scanning period after the third scanning period, the first routing circuit couples the output terminals of the first driving channel, the second driving channel, the third driving channel, and the fourth driving channel to the first data line, the second data line, the third data line, and the fourth data line in the one-to-one manner based on a fourth coupling relationship different from the first coupling relationship, the second coupling relationship, and the third coupling relationship.

9. The driving device as claimed in claim 8, wherein, during the first scanning period, the first routing circuit couples the output terminal of the first driving channel to the first data line, couples the output terminal of the second driving channel to the second data line, couples the output terminal of the third driving channel to the third data line, and couples the output terminal of the fourth driving channel to the fourth data line;

during the second scanning period, the first routing circuit couples the output terminal of the first driving channel to the fourth data line, couples the output terminal of the second driving channel to the first data line, couples the output terminal of the third driving channel to the second data line, and couples the output terminal of the fourth driving channel to the third data line;

during the third scanning period, the first routing circuit couples the output terminal of the first driving channel to the third data line, couples the output terminal of the second driving channel to the fourth data line, couples the output terminal of the third driving channel to the first data line, and couples the output terminal of the fourth driving channel to the second data line; and during the fourth scanning period, the first routing circuit couples the output terminal of the first driving channel to the second data line, couples the output terminal of the second driving channel to the third data line, couples the output terminal of the third driving channel to the fourth data line, and couples the output terminal of the fourth driving channel to the first data line.

10. The driving device as claimed in claim 8, wherein the first routing circuit comprises:

a first switch having a first terminal coupled to the output terminal of the first driving channel, wherein a second terminal of the first switch is coupled to the first data line in the first group of data lines of the self-luminous display panel;

a second switch having a first terminal coupled to the output terminal of the first driving channel, wherein a second terminal of the second switch is coupled to the second data line in the first group of data lines of the self-luminous display panel;

a third switch having a first terminal coupled to the output terminal of the first driving channel, wherein a second terminal of the third switch is coupled to the third data line in the first group of data lines of the self-luminous display panel;

a fourth switch having a first terminal coupled to the output terminal of the first driving channel, wherein a second terminal of the fourth switch is coupled to the fourth data line in the first group of data lines of the self-luminous display panel;

a fifth switch having a first terminal coupled to the output terminal of the second driving channel, wherein a second terminal of the fifth switch is coupled to the first data line in the first group of data lines of the self-luminous display panel;

a sixth switch having a first terminal coupled to the output terminal of the second driving channel, wherein a second terminal of the sixth switch is coupled to the second data line in the first group of data lines of the self-luminous display panel;

a seventh switch having a first terminal coupled to the output terminal of the second driving channel, wherein a second terminal of the seventh switch is coupled to the third data line in the first group of data lines of the self-luminous display panel;

an eighth switch having a first terminal coupled to the output terminal of the second driving channel, wherein a second terminal of the eighth switch is coupled to the fourth data line in the first group of data lines of the self-luminous display panel;

a ninth switch having a first terminal coupled to the output terminal of the third driving channel, wherein a second terminal of the ninth switch is coupled to the first data line in the first group of data lines of the self-luminous display panel;

a tenth switch having a first terminal coupled to the output terminal of the third driving channel, wherein a second terminal of the tenth switch is coupled to the second data line in the first group of data lines of the self-luminous display panel;

an eleventh switch having a first terminal coupled to the output terminal of the third driving channel, wherein a second terminal of the eleventh switch is coupled to the third data line in the first group of data lines of the self-luminous display panel;

a twelfth switch having a first terminal coupled to the output terminal of the third driving channel, wherein a second terminal of the twelfth switch is coupled to the fourth data line in the first group of data lines of the self-luminous display panel;

a thirteenth switch having a first terminal coupled to the output terminal of the fourth driving channel, wherein a second terminal of the thirteenth switch is coupled to the first data line in the first group of data lines of the self-luminous display panel;

a fourteenth switch having a first terminal coupled to the output terminal of the fourth driving channel, wherein a second terminal of the fourteenth switch is coupled to the second data line in the first group of data lines of the self-luminous display panel;

a fifteenth switch having a first terminal coupled to the output terminal of the fourth driving channel, wherein a second terminal of the fifteenth switch is coupled to the third data line in the first group of data lines of the self-luminous display panel; and a sixteenth switch having a first terminal coupled to the output terminal of the fourth driving channel, wherein a second terminal of the sixteenth switch is coupled to the fourth data line in the first group of data lines of the self-luminous display panel.

11. The driving device as claimed in claim 10, wherein, during the first scanning period, the first switch, the sixth switch, the eleventh switch, and the sixteenth switch are turned on, and the second switch, the third switch, the fourth switch, the fifth switch, the seventh switch, the eighth switch, the ninth switch, the tenth switch, the twelfth switch, the thirteenth switch, the fourteenth switch, and the fifteenth switch are turned off;

during the second scanning period, the fourth switch, the fifth switch, the tenth switch, and the fifteenth switch are turned on, and the first switch, the second switch, the third switch, the sixth switch, the seventh switch, the eighth switch, the ninth switch, the eleventh switch, the twelfth switch, the thirteenth switch, the fourteenth switch, and the sixteenth switch are turned off;

during the third scanning period, the third switch, the eighth switch, the ninth switch, and the fourteenth switch are turned on, and the first switch, the second switch, the fourth switch, the fifth switch, the sixth switch, the seventh switch, the tenth switch, the eleventh switch, the twelfth switch, the thirteenth switch, the fifteenth switch, and the sixteenth switch are turned off; and during the fourth scanning period, the second switch, the seventh switch, the twelfth switch, and the thirteenth switch are turned on, and the first switch, the third switch, the fourth switch, the fifth switch, the sixth switch, the eighth switch, the ninth switch, the tenth switch, the eleventh switch, the fourteenth switch, the fifteenth switch, and the sixteenth switch are turned off.

12. The driving device as claimed in claim 1, wherein any one of the driving channels in the first group of driving channels comprises:

a digital-to-analog converter coupled to the corresponding GAMMA voltage circuit in the GAMMA voltage circuits to receive the corresponding group of GAMMA voltages; and a buffer having an input terminal coupled to an output terminal of the digital-to-analog converter, wherein an output terminal of the buffer is coupled to the routing circuit.

13. The driving device as claimed in claim 1, further comprising:

a second group of driving channels, wherein each driving channel in the second group of driving channels is coupled to a corresponding GAMMA voltage circuit in the GAMMA voltage circuits to receive a corresponding group of GAMMA voltages, and each driving channel in the second group of driving channels converts a corresponding sub-pixel data into a corresponding gray scale voltage based on the corresponding group of GAMMA voltages; and a second routing circuit coupled to an output terminal of each driving channel in the second group of driving channels, wherein the second routing circuit dynamically changes a coupling relationship between different driving channels in the second group of driving channels and different data lines in a second group of data lines of the self-luminous display panel during the different scanning periods.

14. An operation method of a driving device, comprising:

providing a plurality of GAMMA voltage circuits comprising a first GAMMA voltage circuit and a second GAMMA voltage circuit, a first group of driving channels, and a first routing circuit, wherein each of the GAMMA voltage circuits generates a group of GAMMA voltages, and each driving channel in the first group of driving channels is coupled to a corresponding GAMMA voltage circuit in the GAMMA voltage circuits to receive a corresponding group of GAMMA voltages, wherein voltage levels of a first group of GAMMA voltages generated by the first GAMMA voltage circuit are the same as voltage levels of a second group of GAMMA voltages generated by the second GAMMA voltage circuit;

converting corresponding sub-pixel data into a corresponding gray scale voltage by each driving channel in the first group of driving channels based on the corresponding group of GAMMA voltages, wherein the first routing circuit is coupled to an output terminal of each driving channel in the first group of driving channels to receive the corresponding gray scale voltage; and changing dynamically a coupling relationship between different driving channels in the first group of driving channels and different data lines in a first group of data lines of a self-luminous display panel by the first routing circuit during different scanning periods.

15. The operation method as claimed in claim 14, wherein the first group of driving channels comprises a first driving channel and a second driving channel, the first driving channel is coupled to the first GAMMA voltage circuit to receive the first group of GAMMA voltages, the second driving channel coupled to the second GAMMA voltage circuit to receive the second group of GAMMA voltages, and the operation method further comprises:

coupling an output terminal of the first driving channel to a first data line in the first group of data lines and coupling an output terminal of the second driving channel to a second data line in the first group of data lines by the first routing circuit during a first scanning period; and coupling the output terminal of the first driving channel to the second data line and coupling the output terminal of the second driving channel to the first data line by the first routing circuit during a second scanning period after the first scanning period.

16. The operation method as claimed in claim 14, wherein the plurality of GAMMA voltage circuits further comprise a third GAMMA voltage circuit, the first group of driving channels comprises a first driving channel, a second driving channel, and a third driving channel, the first driving channel is coupled to the first GAMMA voltage circuit to receive the first group of GAMMA voltages, the second driving channel is coupled to the second GAMMA voltage circuit to receive the second group of GAMMA voltages, the third driving channel is coupled to the third GAMMA voltage circuit to receive a third group of GAMMA voltages, and the operation method further comprises:

coupling an output terminal of the first driving channel, an output terminal of the second driving channel, and an output terminal of the third driving channel to a first data line, a second data line, and a third data line in the first group of data lines in a one-to-one manner based on a first coupling relationship by the first routing circuit during a first scanning period;

coupling the output terminals of the first driving channel, the second driving channel, and the third driving channel to the first data line, the second data line, and the third data line in the one-to-one manner based on a second coupling relationship different from the first coupling relationship by the first routing circuit during a second scanning period after the first scanning period; and coupling the output terminals of the first driving channel, the second driving channel, and the third driving channel to the first data line, the second data line, and the third data line in the one-to-one manner based on a third coupling relationship different from the first coupling relationship and the second coupling relationship by the first routing circuit during a third scanning period after the second scanning period.

17. The operation method as claimed in claim 16, further comprising:

coupling the output terminal of the first driving channel to the first data line, coupling the output terminal of the second driving channel to the second data line, and coupling the output terminal of the third driving channel to the third data line by the first routing circuit during the first scanning period;

coupling the output terminal of the first driving channel to the third data line, coupling the output terminal of the second driving channel to the first data line, and coupling the output terminal of the third driving channel to the second data line by the first routing circuit during the second scanning period; and coupling the output terminal of the first driving channel to the second data line, coupling the output terminal of the second driving channel to the third data line, and coupling the output terminal of the third driving channel to the first data line by the first routing circuit during the third scanning period.

18. The operation method as claimed in claim 14, wherein the plurality of GAMMA voltage circuits further comprise a third GAMMA voltage circuit, and a fourth GAMMA voltage circuit, the first group of driving channels comprises a first driving channel, a second driving channel, a third driving channel, and a fourth driving channel, the first driving channel is coupled to the first GAMMA voltage circuit to receive the first group of GAMMA voltages, the second driving channel is coupled to the second GAMMA voltage circuit to receive the second group of GAMMA voltages, the third driving channel is coupled to the third GAMMA voltage circuit to receive a third group of GAMMA voltages, the fourth driving channel is coupled to the fourth GAMMA voltage circuit to receive a fourth group of GAMMA voltages, and the operation method further comprises:

coupling an output terminal of the first driving channel, an output terminal of the second driving channel, an output terminal of the third driving channel, and an output terminal of the fourth driving channel to a first data line, a second data line, a third data line, and a fourth data line in the first group of data lines in a one-to-one manner based on a first coupling relationship by the first routing circuit during a first scanning period;

coupling the output terminals of the first driving channel, the second driving channel, the third driving channel, and the fourth driving channel to the first data line, the second data line, the third data line, and the fourth data line in the one-to-one manner based on a second coupling relationship different from the first coupling relationship by the first routing circuit during a second scanning period after the first scanning period;

coupling the output terminals of the first driving channel, the second driving channel, the third driving channel, and the fourth driving channel to the first data line, the second data line, the third data line, and the fourth data line in the one-to-one manner based on a third coupling relationship different from the first coupling relationship and the second coupling relationship by the first routing circuit during a third scanning period after the second scanning period; and coupling the output terminals of the first driving channel, the second driving channel, the third driving channel, and the fourth driving channel to the first data line, the second data line, the third data line, and the fourth data line in the one-to-one manner based on a fourth coupling relationship different from the first coupling relationship, the second coupling relationship, and the third coupling relationship by the first routing circuit during a fourth scanning period after the third scanning period.

19. The operation method as claimed in claim 18, further comprising:

coupling the output terminal of the first driving channel to the first data line, coupling the output terminal of the second driving channel to the second data line, coupling the output terminal of the third driving channel to the third data line, and coupling the output terminal of the fourth driving channel to the fourth data line by the first routing circuit during the first scanning period;

coupling the output terminal of the first driving channel to the fourth data line, coupling the output terminal of the second driving channel to the first data line, coupling the output terminal of the third driving channel to the second data line, and coupling the output terminal of the fourth driving channel to the third data line by the first routing circuit during the second scanning period;

coupling the output terminal of the first driving channel to the third data line, coupling the output terminal of the second driving channel to the fourth data line, coupling the output terminal of the third driving channel to the first data line, and coupling the output terminal of the fourth driving channel to the second data line by the first routing circuit during the third scanning period; and coupling the output terminal of the first driving channel to the second data line, coupling the output terminal of the second driving channel to the third data line, coupling the output terminal of the third driving channel to the fourth data line, and coupling the output terminal of the fourth driving channel to the first data line by the first routing circuit during the fourth scanning period.

20. The operation method as claimed in claim 14, further comprising:

providing a second group of driving channels and a second routing circuit, wherein each driving channel in the second group of driving channels is coupled to a corresponding GAMMA voltage circuit in the GAMMA voltage circuits to receive a corresponding group of GAMMA voltages;

converting a corresponding sub-pixel data into a corresponding gray scale voltage by each driving channel in the second group of driving channels based on the corresponding group of GAMMA voltages, wherein the second routing circuit is coupled to an output terminal of each driving channel in the second group of driving channels; and changing dynamically a coupling relationship between different driving channels in the second group of driving channels and different data lines in a second group of data lines of the self-luminous display panel by the second routing circuit during the different scanning periods.

* * * * *